United States Patent
Angus et al.

(10) Patent No.: US 9,361,608 B2
(45) Date of Patent: Jun. 7, 2016

(54) TRANSACTION DISPUTE RESOLUTION

(71) Applicant: NCR Corporation, Duluth, GA (US)

(72) Inventors: Robin Angus, Scotland (GB); Jerome Paler Blanco, Cebu City (PH); Epimaco Daniel Garcia, Cebu City (PH)

(73) Assignee: NCR Corporation, Duluth, GA (US)

(*) Notice: Subject to any disclaimer, the term of this patent is extended or adjusted under 35 U.S.C. 154(b) by 120 days.

(21) Appl. No.: 13/869,097

(22) Filed: Apr. 24, 2013

(65) Prior Publication Data

US 2014/0319210 A1 Oct. 30, 2014

(51) Int. Cl.
*G06Q 40/00* (2012.01)
*G06Q 20/18* (2012.01)
*G07F 19/00* (2006.01)

(52) U.S. Cl.
CPC .............. *G06Q 20/18* (2013.01); *G07F 19/209* (2013.01)

(58) Field of Classification Search
CPC ........................... G06Q 20/18; G06Q 20/3226
See application file for complete search history.

(56) References Cited

U.S. PATENT DOCUMENTS

| 8,556,164 B1* | 10/2013 | Freedman | G06Q 30/0207 235/375 |
|---|---|---|---|
| 2008/0249658 A1* | 10/2008 | Walker et al. | 700/236 |
| 2011/0309137 A1* | 12/2011 | Votaw et al. | 235/375 |
| 2012/0290336 A1* | 11/2012 | Rosenblatt et al. | 705/5 |

FOREIGN PATENT DOCUMENTS

JP 08297707 A * 11/1996

* cited by examiner

*Primary Examiner* — Thien M Le
*Assistant Examiner* — Asifa Hibib
(74) *Attorney, Agent, or Firm* — Schwegman, Lundberg & Woessner

(57) ABSTRACT

The present invention provides a method and apparatus for providing transaction information to a user of a Self-Service Terminal (SST). The method comprises aborting a user initiated transaction at an SST subsequent to an error occurring during the transaction; and displaying an optical device-readable code in a display of a user interface of the SST for identifying at least one parameter associated with the aborted transaction.

12 Claims, 4 Drawing Sheets

TRANSACTION DISPUTE RESOLUTION

FIELD OF THE INVENTION

The present invention relates to providing transaction information to a customer of a Self-Service Terminal (SST). In particular, but not exclusively, the present invention relates to a method and apparatus for providing transaction information to a customer of an SST in the event of a failed transaction to allow the customer to automatically start a dispute resolution process with a person or establishment, such as a bank, associated with the failed transaction.

In the event of a failed customer-initiated transaction at an SST, such as an Automated Teller Machine (ATM), it is known for an error message to be displayed on a display screen of the SST. The error message is intended to alert the customer to the failed transaction and to instruct the customer to contact an official body, such as their bank. Typically, a dispute resolution process is initiated by the customer when contacting their bank about the failed transaction. The error message may include contact details to allow the customer to contact their bank. However, this depends on the customer correctly noting the contact details provided on the screen of the ATM and then accessing and negotiating call queue systems before eventually speaking to a representative. The ATM may alternatively or additionally provide a receipt to the customer on which such information is printed. However, the receipt may become lost or damaged and the same problems of the customer having to actively contact their bank still exist.

Furthermore, such transaction information provided to a customer in the event of a failed transaction is limited. Additionally, in the event a customer's account is not credited with a deposit or is not debited with a withdrawal which has not been successfully completed, the customer or the bank must establish a dialogue between them and then agree what action to take to resolve a potential dispute associate with the failed transaction.

Furthermore, the dispute resolution process is notoriously expensive and requires complex technical analysis of multiple ATM technical and transactional event logs by a skilled technician. Such complex analysis is required to determine the reason for a failed transaction and with whom responsibility lies for a failed transaction in order to resolve a dispute. A skilled technician must first identify the correct transaction records in each log before analyzing each transaction record in detail. Since customer data is never available at the device log, such identification and analysis is typically performed by time and date matching. However, this can be particularly difficult and unreliable as logs are often time stamped by different system clocks and time and dates do not match.

SUMMARY OF THE INVENTION

It is an aim of certain embodiments of the present invention to at least partly mitigate the above-mentioned problems.

It is an aim of certain embodiments of the present invention to provide a method and apparatus for allowing a customer of an SST to easily contact a relevant person or establishment, such as a bank, in the event of a failed customer-initiated transaction at the SST.

It is an aim of certain embodiments of the present invention to provide a method and apparatus for providing transaction information to a customer of an SST which allows the customer to automatically start a dispute resolution process with a relevant person or establishment, such as a bank, associated with the failed transaction and/or SST.

It is an aim of certain embodiments of the present invention to provide a method and apparatus which establishes a unique key for relating all transaction records associated with a failed customer transaction and linking said records with a respective dispute to thereby simplify identification and analysis of transaction records during a dispute resolution process.

It is an aim of certain embodiments of the present invention to provide a method and apparatus for improving the efficiency and reducing the cost of a dispute resolution process associated with a failed customer transaction at an SST.

According to a first aspect of the present invention there is provided a method of providing transaction information to a user of a Self-Service Terminal (SST), comprising:
 aborting a user initiated transaction at an SST subsequent to an error occurring during the transaction; and
 displaying an optical device-readable code in a display of a user interface of the SST for identifying at least one parameter associated with the aborted transaction.

Aptly, the method further comprises:
 providing a unique transaction key embedded in the optical device-readable code and associated with the aborted transaction.

Aptly, the method further comprises:
 associating the unique transaction key with technical and transaction logs of the aborted transaction.

Aptly, the unique transaction key comprises a unique transaction index number.

Aptly, the method further comprises:
 providing a data message generating shortcut embedded in the optical device-readable code.

Aptly, the method further comprises:
 reading the displayed optical device-readable code via a mobile terminal of the user; and
 automatically generating a data message on the mobile terminal to initiate a data message based dialogue with a remote dispute resolution node.

Aptly, the data message comprises an email and/or a Short Message Service (SMS).

Aptly, the method further comprises:
 providing contact information of the user to the remote dispute resolution node.

Aptly, the method further comprises:
 providing an instant notification responsive to the aborted transaction to a remote dispute resolution server.

Aptly, the mobile terminal comprises a smartphone.

Aptly, the optical device-readable code comprises a matrix barcode.

Aptly, the matrix barcode comprises a Quick Response (QR) code.

Aptly, the at least one parameter comprises date, time and/or location information of the aborted transaction, user/account ID relating to the aborted transaction, SST information for identifying the SST at which the aborted transaction occurred, and/or transaction/technical logs of the aborted transaction.

Aptly, the method further comprises:
 displaying an error message in the display.

Aptly, the optical device-readable code and the error message are displayed simultaneously.

According to a second aspect of the present invention there is provided apparatus for providing transaction information to a user of a Self-Service Terminal (SST), comprising:
 a user interface of an SST comprising a display; and
 a controller operable to determine an error during a user initiated transaction at the SST and abort the transaction subsequent to the error; wherein the controller is further operable to display an optical device-readable code in the display for identifying at least one parameter associated with the aborted transaction.

According to a third aspect of the present invention there is provided an SST comprising apparatus for providing transaction information to a user of a Self-Service Terminal (SST), wherein the apparatus comprises:

a user interface of an SST comprising a display; and a controller operable to determine an error during a user initiated transaction at the SST and abort the transaction subsequent to the error; wherein the controller is further operable to display an optical device-readable code in the display for identifying at least one parameter associated with the aborted transaction.

Aptly, the SST is an Automated Teller Machine (ATM).

According to a fourth aspect of the present invention there is provided a method of providing transaction information to a user of a Self-Service Terminal (SST), comprising:

determining an aborted user initiated transaction at an SST; and displaying an optical device-readable code in a display for identifying at least one parameter associated with the aborted transaction.

According to a fifth aspect of the present invention there is provided a method for initiating a dispute resolution process in the event of a failed user transaction at a Self-Service Terminal (SST), the method comprising:

determining a failed user transaction at an SST; and displaying an optical device-readable code for automatically initiating a dispute resolution process with an authorized user of the SST.

According to a sixth aspect of the present invention there is provided a method for initiating a dispute resolution process in the event of a failed user transaction at a Self-Service Terminal (SST), the method comprising:

determining a failed user transaction at an SST;

displaying an error message on a display of the SST to notify a user of the failed transaction; and providing at least one optical device-readable code on the display for the user to scan with an optical code reading device to thereby automatically initiate a dispute resolution process with an authorized user of the SST.

According to a seventh aspect of the present invention there is provided apparatus for initiating a dispute resolution process in the event of a failed user transaction at a Self-Service Terminal (SST), the apparatus comprising:

a display of an SST; and a controller operable to determine a failed user transaction at the SST and display an error message on the display to notify a user of the SST of the failed transaction, wherein the controller is further operable to provide at least one optical device-readable code on the display for automatically initiating a dispute resolution process with an authorized user of the SST when the optical device-readable code is read by an optical code reading device.

Certain embodiments of the present invention provide a method and apparatus for allowing a customer of an SST to easily contact a relevant person or establishment, such as a bank, in the event of a failed customer-initiated transaction at the SST.

Certain embodiments of the present invention provide a method and apparatus for providing transaction information to a customer of an SST which allows the customer to automatically start a dispute resolution process with a relevant person or establishment, such as a bank, associated with the failed transaction and/or SST.

Certain embodiments of the present invention provide a method and apparatus which establishes a unique key for relating all transaction records associated with a failed customer transaction and linking said records with a respective dispute to thereby simplify identification and analysis of transaction records during a dispute resolution process.

Certain embodiments of the present invention provide a method and apparatus for improving the efficiency and reducing the cost of a dispute resolution process associated with a failed customer transaction at an SST.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
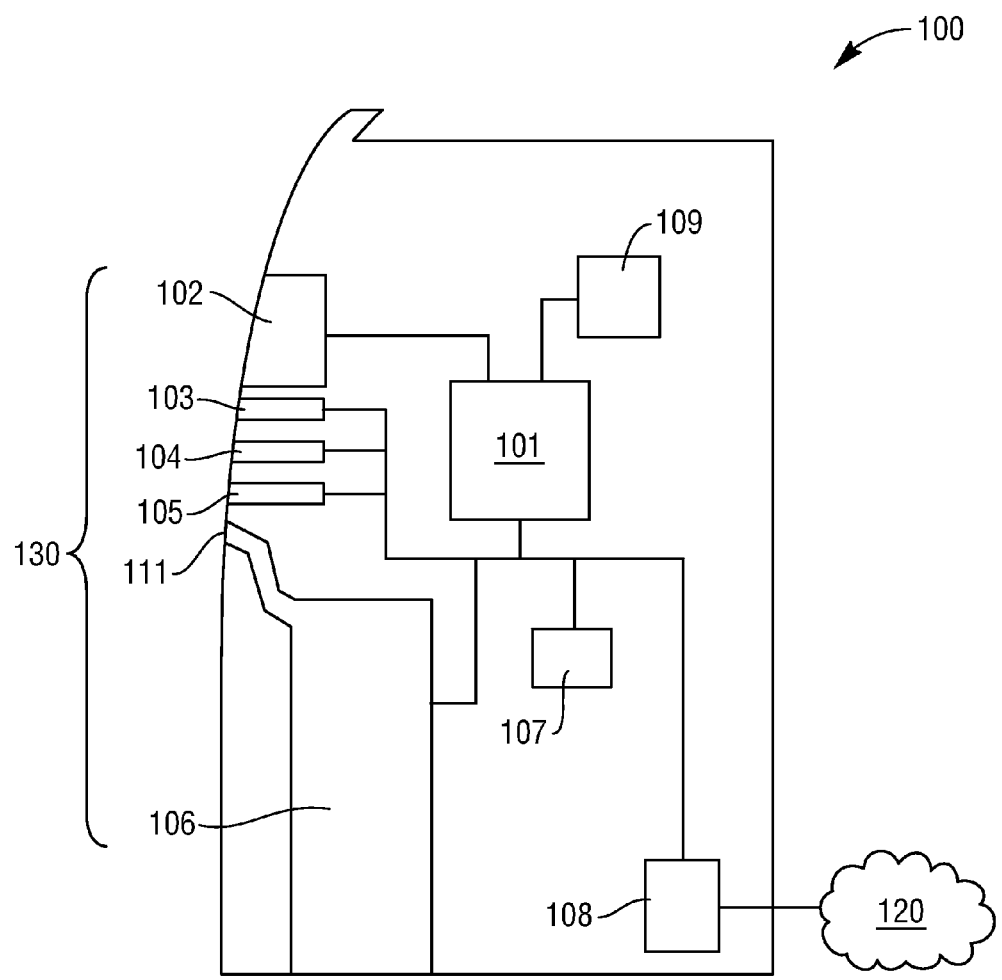
FIG. 1 illustrates a schematic of a Self-Service Terminal (SST) such as an ATM.

In the drawings like reference numerals refer to like parts.

FIG. 1 illustrates a block diagram of a Self-Service Terminal (SST) 100 in the form of an Automated Teller Machine (ATM) according to one embodiment of the present invention. It will be understood that certain embodiments of the present invention are applicable to other types of SST, such as vending machines, kiosks, or the like.

The ATM 100 includes different modules for enabling transactions to be executed and recorded by the ATM 100. These ATM modules include user transaction modules and service personnel modules. The ATM modules include an ATM controller 101, a customer display 102, a card reader/writer module 103, an encrypting keypad module 104, a receipt printer module 105, a cash dispense/deposit module 106, a journal printer module 107 for creating a record of every transaction executed by the ATM, a connection module 108, an operator panel module 109 for use by an authorized user of the SST, such as a service operator, field engineer, a replenisher (of currency, of printed paper or the like), or the like. A user interface 130 of the ATM 100 includes the customer display 102, card reader/writer module 103, encrypting keypad module 104, receipt printer module 105, and a currency dispense/deposit slot 111 in communication with the cash dispense/deposit module 106.

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers. The ATM 100 is a node or network end point in an overall financial network. The ATM 100 is connected to the remainder of the financial network via a connection to the internet 120. It will be appreciated that the ATM 100 could alternatively be connected to the remainder of the financial network via an intranet or other connection network.

A transaction is initiated by a customer of the ATM 100 and may be a deposit of currency by the customer at the ATM to credit their account accordingly. Alternatively, the transaction may be a debit of currency requested by the customer at the ATM to debit their account accordingly. Other transaction types are of course possible. A transaction is typically initiated by a customer via the user interface 130 of the ATM, as shown in FIG. 2.

In the normal event of a customer withdrawal transaction (initiated at step S301 of FIG. 3) being successful (determined and illustrated at D302), currency notes are presented to the customer, their account is debited accordingly (at step S303) and the transaction is successfully completed (T304). In a similar manner, where currency notes are deposited by a customer at an ATM, their account is credited following a successful transaction. However, in the event of a failed transaction (at D302) as a result of, for example, a power failure at the ATM, where a customer's account has not been credited in accordance with currency notes deposited at the ATM by the customer or has been debited with a withdrawal the customer never successfully completed, the transaction is aborted (at S304). Responsive to the controller 101 of the ATM 100 aborting the transaction, an error message 304 is displayed by the controller 101 on the customer display 102 of the ATM 100 notifying the customer of the failed transaction (at step 305 of FIG. 3).

Figure 2:
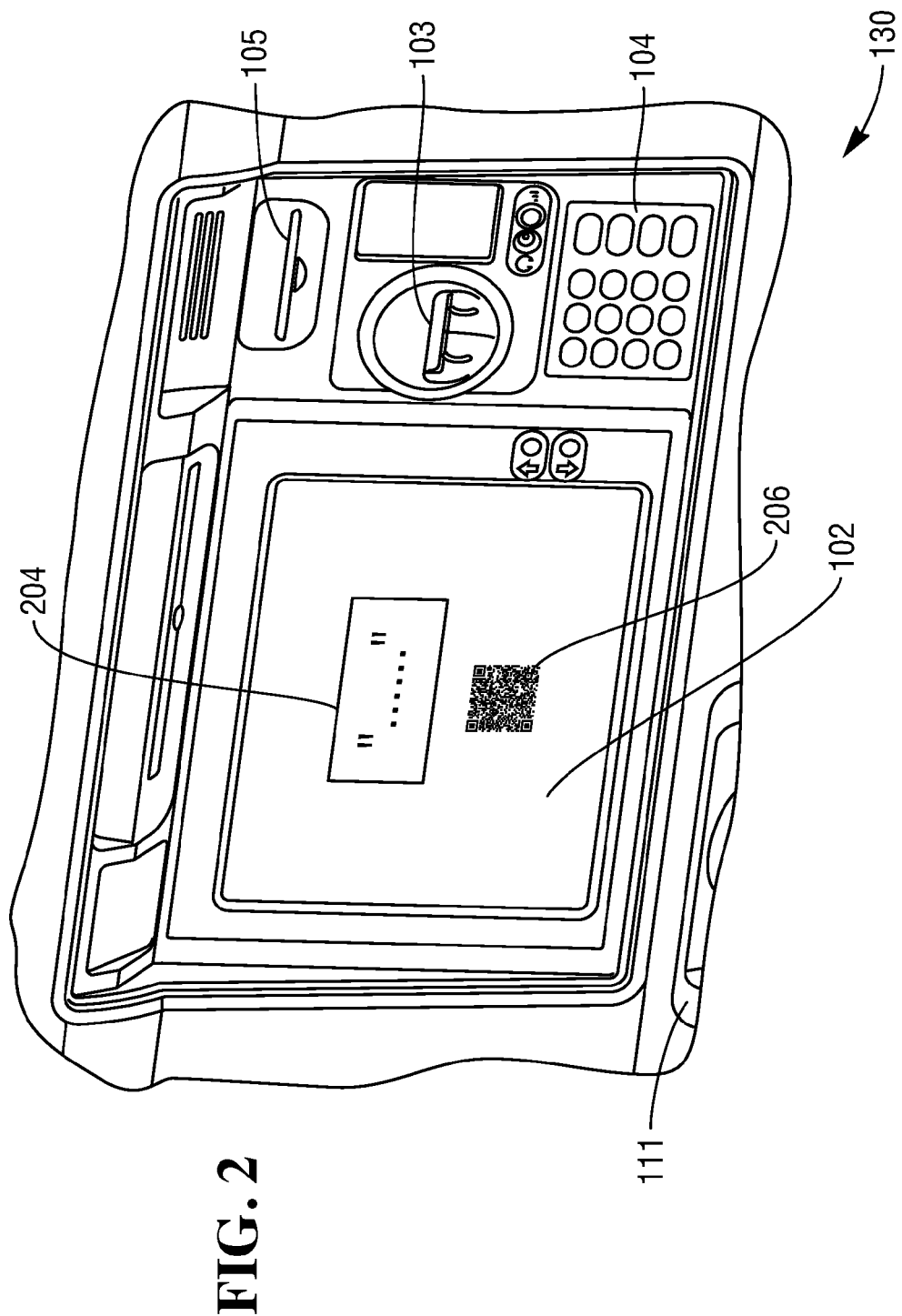
FIG. 2 illustrates a display of an SST displaying information in accordance with an embodiment of the present invention.

In addition to, or as an alternative to, the error message, a Quick Response (QR) code 206 is also displayed (as shown in FIG. 2) which contains a Short Message Service (SMS) shortcut embedded within the QR code. The QR code is readable by a mobile device 401 of the customer, such as a smart phone, tablet or the like.

A QR code is an optical machine-readable matrix barcode (or two dimensional barcode). They may be attached to an item or displayed and records information related to the item or a service associated with the item. The code consists of black modules (square dots) selectively arranged in a square grid on a white background in respect to the information recorded by the code. The information encoded may be made up of four standard types which are numeric, alphanumeric, byte/binary and Kanji, or, through supported extensions, virtually any type of data. A QR code is read by an imaging device, such as a camera, and formatted algorithmically by underlying software using Reed-Solomon error correction, or the like, until the image can be appropriately interpreted. Data is then extracted from patterns present in both horizontal and vertical components of the image. A suitable imaging device for reading a QR code may be provided by a smartphone, tablet, or the like.

Figure 3:
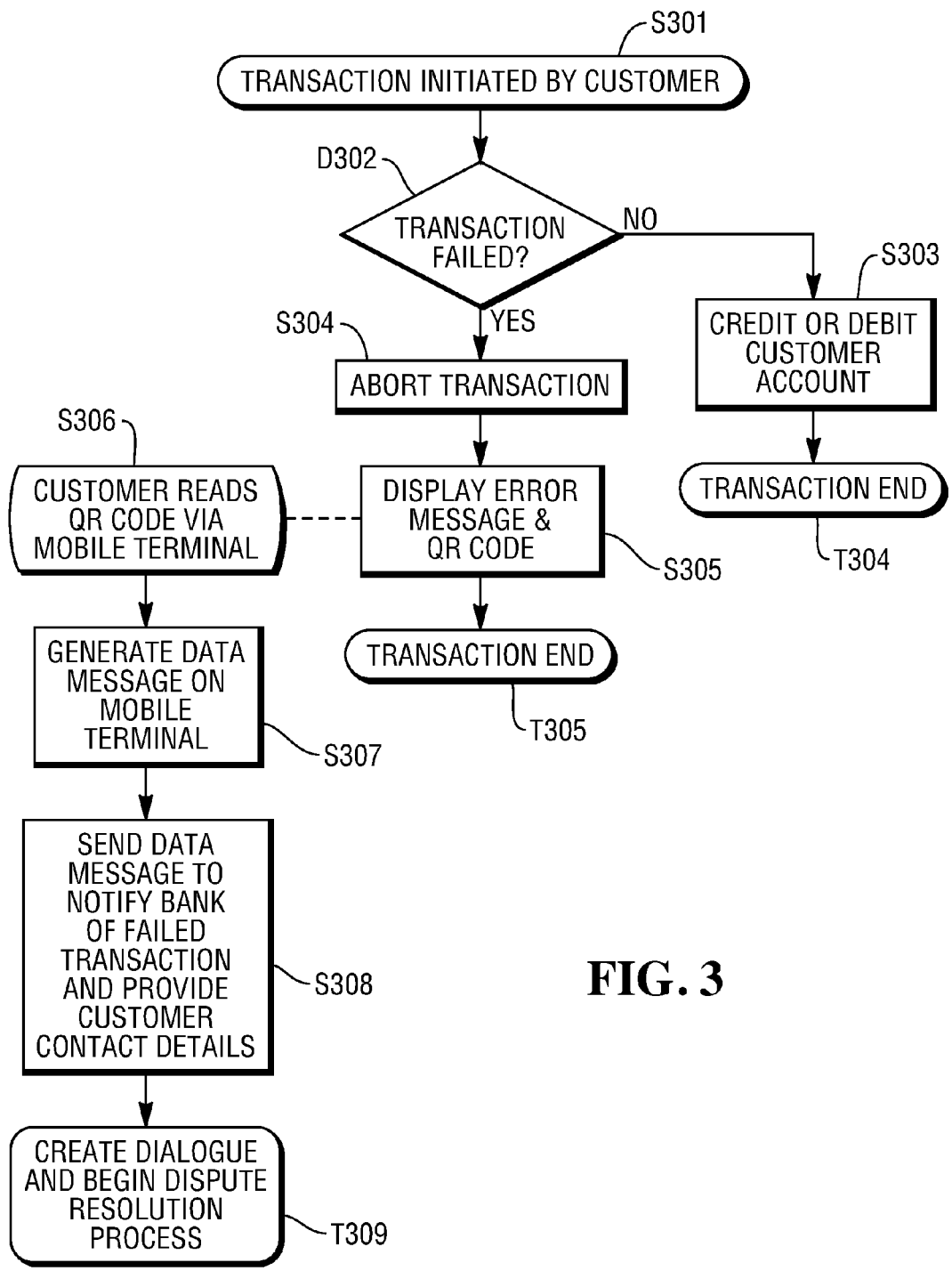
FIG. 3 illustrates a flow diagram to show the steps of initiating a transaction dispute resolution process in accordance with an embodiment of the present invention.
Figure 4:
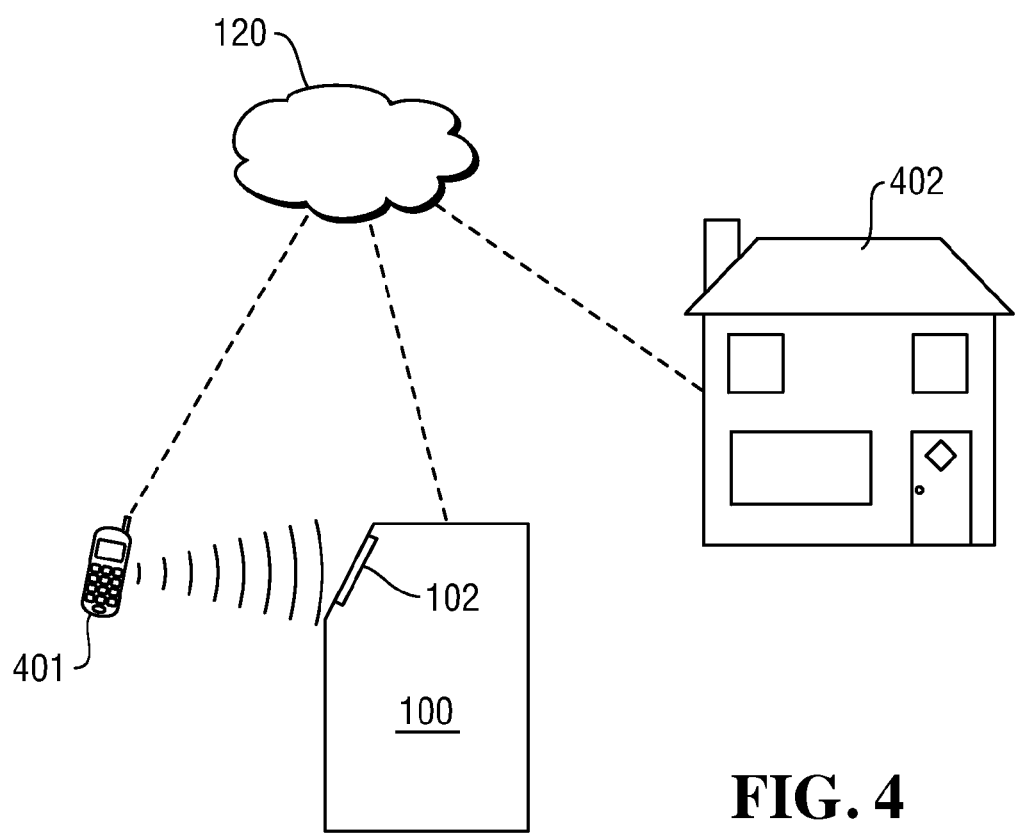
FIG. 4 illustrates a data network in accordance with an embodiment of the invention.

As illustrated in FIGS. 3 and 4, when the QR code is successfully read by the mobile device 401 (step 306), an SMS application is automatically launched on the mobile device 401 and an SMS message is automatically generated on the mobile device 401 (step 307) and sent to a remote node, such as the associated bank 402, or similar establishment or related association, such as a dispute resolution helpdesk (step 308). The SMS message may simply notify the bank 402 of the failed transaction and provide at least a contact telephone number to allow the bank to easily contact the customer in order to establish a dialogue for resolving any dispute relating to the failed transaction. The SMS message may be sent to the bank 402 via the internet 120, or other connection network, and other suitable types of data message may be generated, such as an email, in addition or as an alternative to an SMS message.

The error message displayed after a failed transaction may read, for example, "Sorry, there has been a problem. Your transaction has not been successful. Please contact your branch directly by telephoning the number below. Alternatively, please scan the QR code below with your mobile device to automatically initiate a resolution process. We apologize for any inconvenience caused".

For each transaction, a transaction index number is generated by the controller 101 and propagated through all technical and transaction records of a transaction. A unique key is generated by the controller 101 and also embedded in the QR code 206 to be simultaneously displayed on the display 102 of the ATM 100 with the error message in the event of a failed transaction. The unique key is associated with the transaction index number of a respective transaction which has failed and thereby links all transaction records with the failed transaction and a potential dispute. Via the QR code, this unique key is included in the generated SMS message and allows a bank 402, on receiving the SMS message from the customer's mobile device 401, to easily identify the ATM 100 at which the failed transaction occurred and all technical and transaction records associated with the failed transaction.

Certain embodiments of the present invention therefore make the process of establishing who, when, what ATM, which transaction etc. less complex and, in turn, makes the dispute resolution process much quicker and less expensive. One or more characteristics associated with the failed transaction may be automatically transmitted to the remote node and/or supplied to the customer. A bank's dispute resolution helpdesk is provided with an instant notification of a potential dispute. All or at least some of the data required for analysis during a dispute resolution investigation is linked together by a unique key which greatly reduces the effort, time and cost required to investigate a dispute. An up-to-date customer contact telephone number is provided to the bank which helps to maintain up-to-date records for each customer. The customer is provided with a practical solution for notifying their bank of a failed transaction and initiating a potential dispute, which in turn provides the customer with a positive sense of control of the situation.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of providing transaction information to a user of a Self-Service Terminal (SST), comprising:
   aborting a user initiated transaction at an SST subsequent to an error occurring during the transaction; and
   displaying an optical device-readable code in a display of a user interface of the SST for identifying at least one parameter associated with the aborted transaction;
   wherein the optical device-readable code contains information for facilitating communication of the error by a mobile device following scanning of the optical device-readable code, and wherein the optical device-readable code includes an embedded Short Message Service that when scanned by a mobile device of the user from the user interface an SMS application is automatically launched on the mobile device and sends an SMS message from the mobile device to a remote dispute resolution node, wherein the SMS message includes notification of the error and a user contact telephone number for the mobile device.

2. The method as claimed in claim 1, further comprising:
   providing a unique transaction key embedded in the optical device-readable code and associated with the aborted transaction.

3. The method as claimed in claim 2, further comprising:
   associating the unique transaction key with technical and transaction logs of the aborted transaction.

4. The method as claimed in claim 1, further comprising:
   providing contact information of the user to the remote dispute resolution node.

5. The method as claimed in claim 4, further comprising:
   providing an instant notification responsive to the aborted transaction to a remote dispute resolution server.

6. The method as claimed in claim 1, wherein the optical device-readable code comprises a matrix barcode.

7. The method as claimed in claim 6, wherein the barcode comprises a Quick Response (QR) code.

8. The method as claimed in claim 1, wherein the at least one parameter comprises date, time and/or location information of the aborted transaction, user/account ID relating to the aborted transaction, SST information for identifying the SST at which the aborted transaction occurred, and/or transaction/technical logs of the aborted transaction.

9. The method as claimed in claim 1, further comprising:
   displaying an error message in the display.

10. The method as claimed in claim 9 wherein the optical device-readable code and the error message are displayed simultaneously.

11. Apparatus for providing transaction information to a user of a Self-Service Terminal (SST), comprising:
    a user interface of an SST comprising a display; and
    a controller operable to determine an error during a user initiated transaction at the SST and abort the transaction subsequent to the error; wherein the controller is further operable to display an optical device-readable code in the display for identifying at least one parameter associated with the aborted transaction;
    wherein the optical device-readable code contains information for facilitating communication of the error by a mobile device following scanning of the optical device-readable code by the mobile device, and wherein the optical device-readable code includes an embedded Short Message Service that when scanned by the mobile device of the user from the display automatically launches an SMS application on the mobile device sends an SMS message from the mobile device to a remote dispute resolution node, wherein the SMS message includes notification of the error and a user contact telephone number for the mobile device.

12. A method of providing transaction information to a user of a Self-Service Terminal (SST), comprising:
    determining an aborted user initiated transaction at an SST; and
    displaying a two-dimensional barcode in a display for identifying at least one parameter associated with the aborted transaction;
    wherein the two-dimensional barcode contains information for configuring a mobile device following scanning of the two-dimensional barcode to send a message containing the error to a remote dispute resolution node, and wherein the two-dimensional barcode includes an embedded Short Message Service that when scanned by the mobile device of the user from the display automatically launches an SMS application on the mobile device and sends an SMS message from the mobile device to the remote dispute resolution node, wherein the SMS message includes notification of the error and a user contact telephone number for the mobile device.

* * * * *